(12) United States Patent
Harwood et al.

(10) Patent No.: US 10,788,994 B1
(45) Date of Patent: Sep. 29, 2020

(54) DISAGGREGATION OF FLASH MANAGEMENT

(71) Applicant: EMC IP Holding Company LLC, Hopkinton, MA (US)

(72) Inventors: John S. Harwood, Paxton, MA (US); Robert W. Beauchamp, Berlin, MA (US); Roy E. Clark, Hopkinton, MA (US); Dragan Savic, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 14/586,083

(22) Filed: Dec. 30, 2014

(51) Int. Cl.
*G06F 3/06* (2006.01)

(52) U.S. Cl.
CPC .......... *G06F 3/0626* (2013.01); *G06F 3/0653* (2013.01); *G06F 3/0688* (2013.01)

(58) Field of Classification Search
None
See application file for complete search history.

(56) References Cited

U.S. PATENT DOCUMENTS

| 7,646,636 | B2* | 1/2010 | Kim | G06F 12/0246 365/168 |
| 8,677,054 | B1* | 3/2014 | Meir | G06F 12/0246 707/817 |
| 2011/0107053 | A1* | 5/2011 | Beckmann | G06F 3/0608 711/171 |
| 2012/0017037 | A1* | 1/2012 | Riddle | G06F 16/24569 711/103 |
| 2012/0066473 | A1* | 3/2012 | Tremaine | G06F 12/06 711/206 |
| 2013/0173875 | A1* | 7/2013 | Kim | G06F 12/0246 711/160 |

* cited by examiner

*Primary Examiner* — Gary W. Cygiel
(74) *Attorney, Agent, or Firm* — Ryan, Mason & Lewis, LLP

(57) ABSTRACT

A system, computer program product, and computer-executable method for managing flash devices within a data storage environment utilized by an application of one or more applications, wherein the application accesses the managed flash devices through a pool of flash storage provided by the data storage, the system, computer program product, and computer-executable method comprising receiving a data I/O from the application, analyzing the data I/O directed toward the pool of flash storage in relation to the flash devices, and managing the flash devices based on data I/Os directed toward the pool of flash storage by the application.

20 Claims, 12 Drawing Sheets

DISAGGREGATION OF FLASH MANAGEMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method for managing flash devices within a data storage environment utilized by an application of one or more applications, wherein the application accesses the managed flash devices through a pool of flash storage provided by the data storage, the system, computer program product, and computer-executable method comprising receiving a data input/output (I/O) from the application, analyzing the data I/O directed toward the pool of flash storage in relation to the flash devices, and managing the flash devices based on data I/Os directed toward the pool of flash storage by the application.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
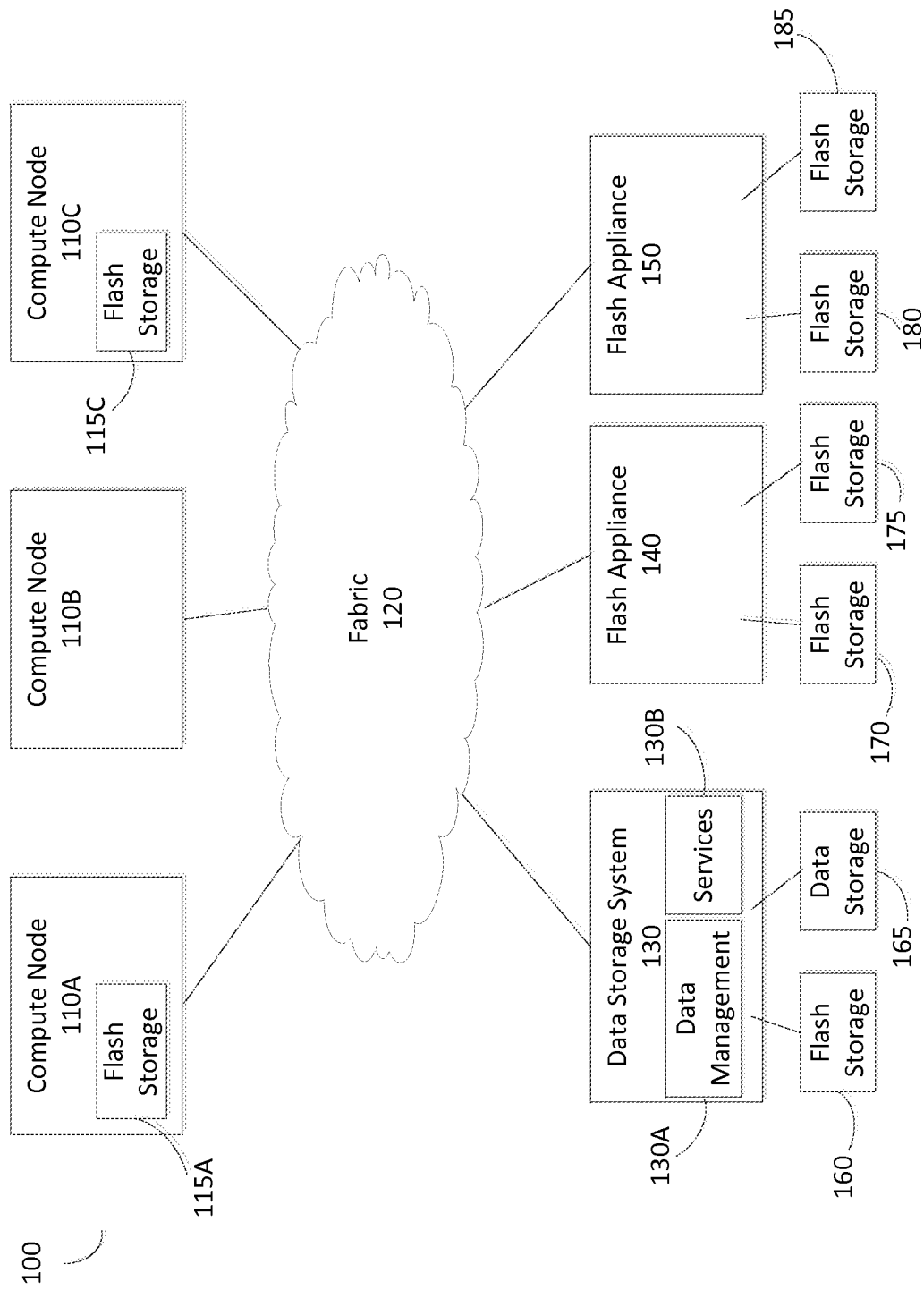
FIG. 1 is a simplified illustration of a data storage system in a data storage environment, in accordance with an embodiment of the present disclosure.

Typically, flash vendors treat flash controller space like a black box. Traditionally, flash vendors do not expose their product's controller design and/or do not expose many control points to their flash controllers. Generally, flash vendors maintaining control over the flash controller space has worked well for Solid State Drive (SSD) devices as the drives are self-contained and the controller manages the local chips. Traditionally, flash vendors package their chips into devices, and arrange the devices into subsystems, controlling these layers using management functionality built into each device. Conventionally, flash vendors often create unique implementations which are variable between flash venders and can be variable between devices from the same flash vendor. Traditionally, as devices are packaged together, the data storage industry would benefit from being enabled to gain more control to enable management of flash at subsystem and/or system level.

In many embodiments, the current disclosure may enable creation of a data storage system that may be enabled to provide a uniform deterministic interface to one or more data storage devices. In various embodiments, the current disclosure may enable creation of a data management module within the data storage system to manage one or more interfaces provided by data storage devices. In most embodiments, a data storage device may include Solid State Drives (SSD) devices, rotational disks, and/or other Non-Volatile Memory (NVM) devices. In certain embodiments, the current disclosure may enable a data management module to manage a device layer which may allow for any device, technology, and/or controller implementation to communicate with the data management module. In many embodiments, a data management module may be enabled to interface with low level functions of a data storage device, including, but not limited to, physical allocation of erase-units and/or the ability to independently write to any of those units.

In some embodiments, the current disclosure may enable a data management module to present a uniform deterministic interface to applications utilizing the data storage system. In most embodiments, the current disclosure may enable a data management module to provide an abstraction of connected devices, technology, and/or controller implementations. In various embodiments, an abstraction may appear to one or more applications as a single entity to meet application needs expressing a prescribed Quality of Service (QoS), where the data management module may be enabled to provide the QoS from the connected devices, technology, and/or controller implementations in communication with the data management module. In some embodiments, the devices, technology, and/or controller implementations may be included in the data storage system. In other embodiments, the devices, technology, and/or controller implementations may be in communication with the data storage system while being externally housed. In other embodiments, a data management module may be enabled to manage and/or test additional characteristics of NVM devices across a set of global devices.

In many embodiments, a data management module may be enabled to manage data storage devices, such as SSD devices, together in a single pool exposed as a single abstraction to applications. In various embodiments, a data management module may be enabled to provide a deterministic interface to applications. In certain embodiments, a data management module may be enabled to adapt and/or may be updated to communicate with newer NVM technology as it may become available. In other embodiments, a data management module may be enabled to extend interfaces to current and/or new NVM devices to include new functionality. In most embodiments, a data management module may enable a reduced dependency on data storage device vendors and/or may enable a data storage system to provide a uniform interface for each version of every data storage device.

In other embodiments, a data management module may be enabled to allocate a data storage device that supports multiple write streams with one writer per stream. In these embodiments, different streams may be assigned different update-frequency data, hence the minimum number of devices that may be needed by a system may be reduced compared to the strict sequential case. In most embodiments, a data management module may be enabled to separate I/O streams based on one or more characteristics. In various embodiments, a data management module may be enabled to keep high write workloads together. In other embodiments, a data management module may be enabled to keep low write workloads together. In some embodiments, keeping high workloads together and keeping low workloads together may allow for I/O streams that may churn the erase block to be grouped together and may limit the garbage collection overhead for mixed workloads. For example, in many embodiments, low intensity write workloads may be grouped together to keep the Garbage Collection overhead low for the I/O stream associated with the low intensity write workloads. In other embodiments, machine learning techniques may be used that may enable a data management module to gain intelligence regarding I/O streams managed by the data management module. In various embodiments, a data management module may be enabled to differentiate I/O streams and act based upon the differentiated I/O streams without outside intervention by a user and/or administrator.

In certain embodiments, a data management module may be enabled to recode the data to take advantage of low entropy such that most bits may be in the erased state, which may increase endurance by reducing the number of times on average that a cell must be programmed to its higher charge state. In alternative embodiments, a data management module may be enabled to compress data which may enable increased endurance by reducing the amount of data stored on the data storage device. In most embodiments, compression may require that the lifetime measurement dynamically determines the health of the cells rather than being based on a fixed Program Erase (PE) count. In many embodiments, a solid state storage program erase (PE) cycle may be a sequence of events in which data may be written to a solid state NAND flash memory cell, then erased, and then rewritten. In various embodiments, Program erase (PE) cycles may serve as a criterion for quantifying the endurance of a flash storage device. In various embodiments, compression may be one aspect of data shaping externally, buying space back on a data storage device and may enable limiting of write amplification.

In many embodiments, a data management module may be enabled to directly manage NVM devices and/or management functions traditionally managed by NVM devices. In various embodiments, a data management module may be enabled to manage services such as, but not limited to, over provisioning, write management, I/O analysis, wear leveling, device configuration, garbage collection, data shaping, direct mapped buffers, as well as other services managed on NVM devices.

In some embodiments, managing over provisioning may include how much, or how little, of a NVM device's total storage capacity may be provisioned based on usage as well as the IO flow characteristics. In some embodiments, a data management module may be enabled to manage and/or test over provisioning. In most embodiments, a data management module may be enabled to manage one or more data storage devices as an abstraction, hiding capacity of the data storage devices from the applications. In various embodiments, hiding capacity of data storage devices may enable use of additional capacity for writes when workloads may be write intensive. In other embodiments, where I/O workloads may be read intensive, a data management module may be enabled to expose more capacity of the underlying data storage devices, yielding some of the over provisioning as it may not be needed for reads.

In other embodiments, write management of a NVM device may include I/O alignment and/or write tiering. In some embodiments, I/O alignment may be done by the data management module to size I/Os to the erase block size to best place data on the persistent memory devices, which may reduce any additional internal I/O operations on the device. In certain embodiments, write tiering may include grouping I/O writes that may be updated at a similar frequency. In some embodiments, write tiering may facilitate wear management as similar NVM devices may be chosen for a specified write tier and/or wear management may be managed on a global level.

In most embodiments, a data management module may be enabled to stage I/O writes on a NVM device that may allow for aggregation of writes into large blocks. In various embodiments, large blocks staged to a NVM device may enable eliminating the read modify write that may be required for blocks smaller than an erase block size. In certain embodiments, a data management module may aggregate writes into large blocks to implicitly control garbage collection on one or more NVM devices. In many embodiments, a data management module may be enabled to aggregate writes to a large block that may be a size multiple times larger than an erase block size. In various embodiments, the aggregated write may be enabled to insure full writes and no fragmentation may be incurred. In some embodiments, to accomplish the aggregate write, a data management module may leverage a log write approach to block mapping.

In most embodiments, when a data management module is leveraging a log write approach, all blocks may be written new and not "in place." In various embodiments, an abstraction within the data management module may keep a mapping of application based Logical Unit Number (LUN) abstraction to a backend pool of blocks. In these embodiments, this may allow writes to be coalesced into large blocks and written to devices to avoid the fragmentation and promotion of blocks to erase blocks prematurely. In many embodiments, while a flash device may be written to using various sized I/Os, the flash device may allow erasure in specified larger block sizes, which may often be called an erase block. In various embodiments, an erase block may be one or more magnitudes larger than that of a normal I/O block size.

In many embodiments, a data management module may be enabled to analyze application I/O streams as each application writes to the data storage system. In various embodiments, while writes may be sent in large blocks to insure the erase block size may be leveraged, each I/O stream may have varying read/write ratios and write intensity. In certain embodiments, a data management module may enable I/O streams from applications with smaller working sets, lower reuse of data, and/or infrequent writes to be separated from high write workloads or working sets with high data reuse. In some embodiments, coalescing work streams with lower write intensity together, the large writes performed to devices may not contain elements that may be updated frequently and may minimize the updates to embedded blocks that may be fragmented during a TRIM and unintentionally provoke garbage collection on a data storage device. In most embodiments, separating "hot edge" and "cold core" type work streams may minimize fragmentation that may be caused by TRIM and/or garbage collection. In various embodiments, a TRIM command may be a host based function that may alert a device when blocks may no longer be used and may be considered for erasure. In many embodiments, a hot edge may refer to stored data frequently accessed. In various embodiments, a cold core may refer to stored data infrequently accessed.

In various embodiments, a "hot edge" may be updated more frequently and may benefit from being coalesced together. In these embodiments, blocks may be updated frequently and the TRIM may be more likely to touch multiple blocks in an erase block and may free large sections during the TRIM, which may minimize the read/modify/write overhead. In other embodiments, writes may be further managed by tracking the write usage of a data storage device through the device interface. In certain embodiments, the device interface may be a SMART interface, which may be a standard interface to monitor device information. In these embodiments, with regard to NVM memory, NVM memory devices may often expose write and/or endurance information using a SMART interface. In some embodiments, a data management module, in managing data I/Os, may be enabled to determine how the write usage of a device may be progressing and whether or not writes should be continued on a device or set of devices.

In most embodiments, I/O analysis may include analyzing incoming I/Os to determine patterns and/or periods of high and/or low data storage usage which may enable a data management module to make I/O aware decisions as to how to use NVM devices. In most embodiments, a data management module may be enabled to use hints and/or application awareness to manage one or more data storage devices managed by the data management module within the data storage system. In various embodiments, a data management module may be enabled to use known data storage characteristics to manage one or more data storage devices. In some embodiments, a data management module may be enabled to use known characteristics of Flash SSD devices to manage one or more Flash SSD devices. In any embodiments, a hint may include one or more portion of data that may indicate future storage resource usage.

In various embodiments, wear leveling may include moving data across one or more NVM devices to manage wear level of each respective NVM device. In certain embodiments, a data management module may be enabled to extend a NVM device's useful life by balancing a usage load across all NVM devices within a data storage system.

In most embodiments, a data management module may be enabled to monitor the wear-health of multiple sets of data storage devices and may be enabled to manage the role-assignment and migration of data between those sets in order to globally level (or to purposefully level) the wear of the flash. In various embodiments, a data management module may be enabled to manage a set of devices and/or tiering and may be enabled to decide when to service and/or reconfigure data storage device parameters.

In most embodiments, a data management module may be enabled to spread I/O writes among one or more data storage devices uniformly which may enable avoiding hot spots, i.e. NVM devices with overly heavy wear. In various embodiments, enabling uniform writes may be accomplished through using a uniform hashing scheme as an address. In certain embodiments, using a uniform hashing scheme may enable management of data storage device endurance across all devices as a global parameter. In certain embodiments, if write endurance is not uniform across data storage devices in the pool of devices, the write endurance may be enabled to be managed by monitoring SMART. In some embodiments, data storage devices that may have less writes may be used less to extend the writes for the pool of devices managed by the data management module. In other embodiments, the availability of writes may be managed in aggregate.

In certain embodiments, device configuration may include a data management module modifying a NVM device's internal parameters, such as a retention parameter. In some embodiments, setting a low retention parameter may enable a NVM device to reduce the need for garbage collection as the low retention parameter may signify that the NVM device may be updated often. In many embodiments, a data management module may be enabled to manage a retention period of data stored on data storage devices. In various embodiments, if a workload is write intensive then the consistent overwrites may obviate the need for long retention periods for the data. In most embodiments, minimizing the retention period of data may enable increasing write endurance of a data storage device.

In most embodiments, a data management module may be enabled to match I/O workloads to retention periods and/or configure data storage devices within the data storage system accordingly. In some embodiments, the data management module may be enabled to configure a data storage device as a cache only device. In other embodiments, the data management module may be enabled to configure a data storage device as a heavy read/write workload device. In certain embodiments, using a device as a cache only device, if the device fails, the information may always be retained elsewhere. In these embodiments, using a device as a cache only device may enable great response time for users accessing data on the device. In various embodiments, a flash devices configured for heavy read/write workloads may enable an application to leverage the lowest response time for the I/Os.

In many embodiments, garbage collection may refer to a NVM device cleaning up outdated and/or unused portions of memory on the NVM device. In some embodiments, garbage collection may reduce availability of data storage because garbage collection may take up available resources to complete the operation. In most embodiments, a data management module may be enabled to direct a NVM device to execute garbage collection during times of low usage, when garbage collection may not affect other I/Os to the NVM device.

In various embodiments, a data management module may be enabled to manage how much of a device's storage space to populate in order to manage garbage collection write amplification of the device. In certain embodiments, a data management module may be able to have real-time visibility into the garbage collection rate of a data storage device and/or may be enabled to know the quantity of physical and logical space of a data storage device. In most embodiments, a data management module may use visibility into garbage collection of a data storage device and/or knowledge of the quantity of physical and logical spaced of a data storage device to reduce wear, manage performance, and garbage collection overhead for write heavy workloads. In various embodiments, visibility into garbage collection of a data storage device may enable a data management module to reduce write amplification and/or force similar behavior to an erase block to provide deterministic Garbage Collection behavior. In certain embodiments, a data management module may be enabled to determine Garbage Collection behavior for a drive to determine how I/Os may be impacted. In some embodiments, understanding garbage collection takes drive resources to accomplish and understanding what the drive may be doing during Garbage Collection may enable a data management module to manage I/Os accordingly to increase performance.

In many embodiments, a data management module may be enabled to organize data into similar write-temperature groups stored in different flash garbage collection domains which may be enabled to minimize write amplification. In various embodiments, each group may use commensurately different endurance flash and/or wear-leveling may be managed on a global level by a data management module. In some embodiments, a data management module may be enabled to identify the expected update/delete frequency so the data may be placed in the appropriate write tier, such as, but not limited to, cold, hot, and/or compute node tier.

In some embodiments, a data management module may be enabled to explicitly manage when one or more data storage devices execute garbage collection to avoid interference during, for example, write bursts and/or heavy read bursts to a specified data storage device. In certain embodiments, a data management module may be enabled to isolate garbage collection of data storage devices during low activity. In many embodiments, a data management module may be enabled to allocate a data storage device as a strictly sequential circular store in a non-overprovisioned device, which may nullify the data storage device's garbage collection. In various embodiments, a data storage device utilized for strictly sequential writes may only have one writer and/or multiple readers. In certain embodiments, a data management module may ensure that data written to the strictly sequential circular store at the same update-frequency class. In some embodiments, providing writes in a sequential fashion with writes of the same "temperature," data may be written to a flash drive to match the drive characteristics and a data management module may be enabled to fill the erase blocks in such a way to perform "complete" writes and may be enabled to reduce and/or eliminate Garbage Collection. In these embodiments, writes from a data management module may be tuned to the flash management on the flash device.

In many embodiments, a data management module may be enabled to manage one or more Flash SSD devices by managing writes to and from each of the one or more Flash SSD devices. In various embodiments, a data management module may be enabled to implicitly control garbage collection by managing writes to a Flash SSD device. In other embodiments, a data management module may be enabled to explicitly manage Flash SSD device endurance/longevity through control of writes to each respective Flash SSD Device.

In some embodiments, a data management module may be enabled to use data shaping to increase efficiency of one or more NVM devices. In certain embodiments, data shaping may include recoding data to take advantage of low entropy states within a NVM device. In various embodiments, a data management module may enable data storage devices to export buffer space, some of which may support power fail protection (i.e., NVM space) that may be mapped to LBA space of a drive. In certain embodiments, a general buffer function may allow for reduced CPU memory traffic which may reduce contention on the control processing. In some embodiments, the NVM buffer functions may remove the need for specialized NVM cards.

Refer to the example embodiment of FIG. 1. FIG. 1 is a simplified illustration of a data storage system in a data storage environment, in accordance with an embodiment of the present disclosure. Data storage environment 100 includes compute node 110A, compute node 110B, compute node 110C, data storage system 130, flash appliance 140, and flash appliance 150. Each portion of data storage environment 100 is in communication with each other portion using fabric 120. Compute node 110A includes flash storage 115A and compute node 110C includes flash storage 115C. As shown, flash appliance 140 includes flash storage 170 and flash storage 175. Flash appliance 150 includes flash storage 180 and flash storage 185.

In this embodiment, data storage system 130 includes data management module 130A, services module 130B, flash storage 160, and data storage 165. In many embodiments, flash data storage and/or traditional data storage (rotational discs) may be included within a data storage system. In various embodiments, a data storage system may not include flash storage and/or traditional data storage and instead may be in communication with flash storage and/or traditional data storage. In many embodiments, a data management module in a data storage system may be enabled to manage flash storage on a global scale. In various embodiments, a data management module may be enabled to manage a plurality of flash devices using device level flash management techniques, including, but not limited to, managing overprovisioning, write tiering, managing I/Os, garbage collection, and/or other flash device level management functions.

Figure 2:
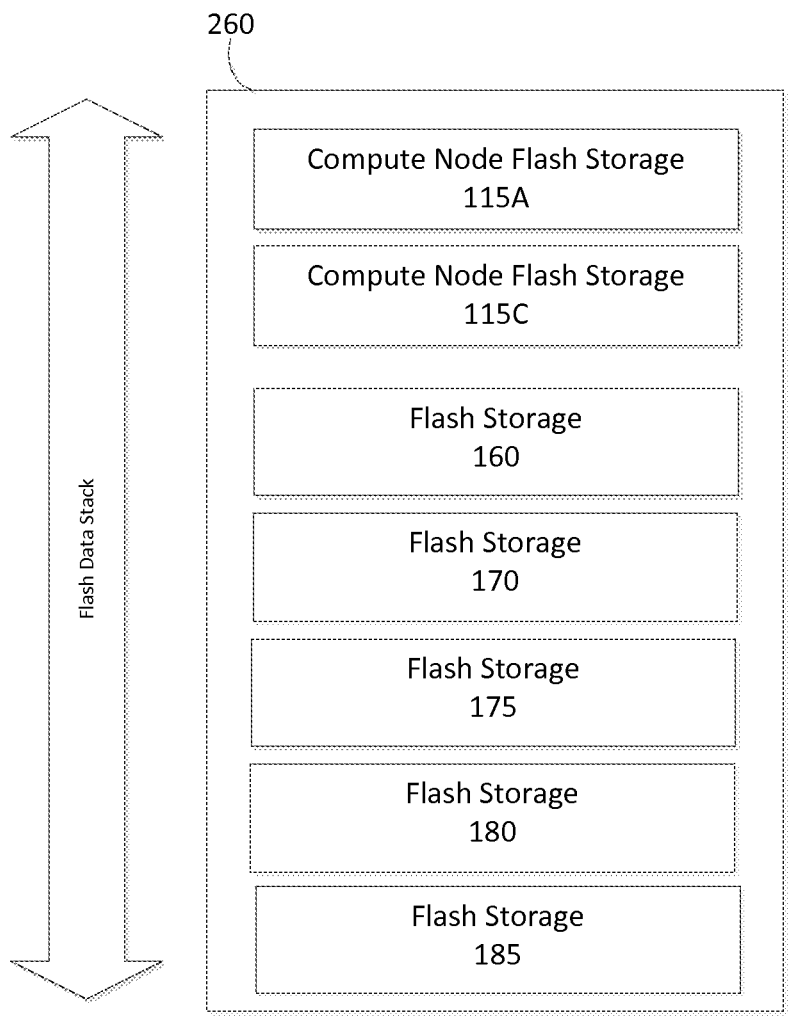
FIG. 2 is a simplified illustration of a flash data stack of data storage shown in the data storage environment of FIG. 1, in accordance with an embodiment of the present disclosure.

Refer to the example embodiment of FIGS. 1 and 2. FIG. 2 is a simplified illustration of a flash data stack of data storage shown in the data storage environment of FIG. 1, in accordance with an embodiment of the present disclosure. As shown, flash data stack 260 includes compute node flash storage 115A, compute node flash storage 115C, and flash storage 160, 170, 175, 180, 185. Flash data stack 260 represents all flash storage within data storage environment 100 (FIG. 1) managed by data management module 130A (FIG. 1). In many embodiments, a data management module may be enabled to move data between one or more flash storage devices within a data storage environment. In various embodiments, a data management module may be enabled to designate one or more flash storage devices as with a specified task, such as, but not limited to, designated as cache or designated as a heavy read/write I/O flash storage device.

Figure 3:
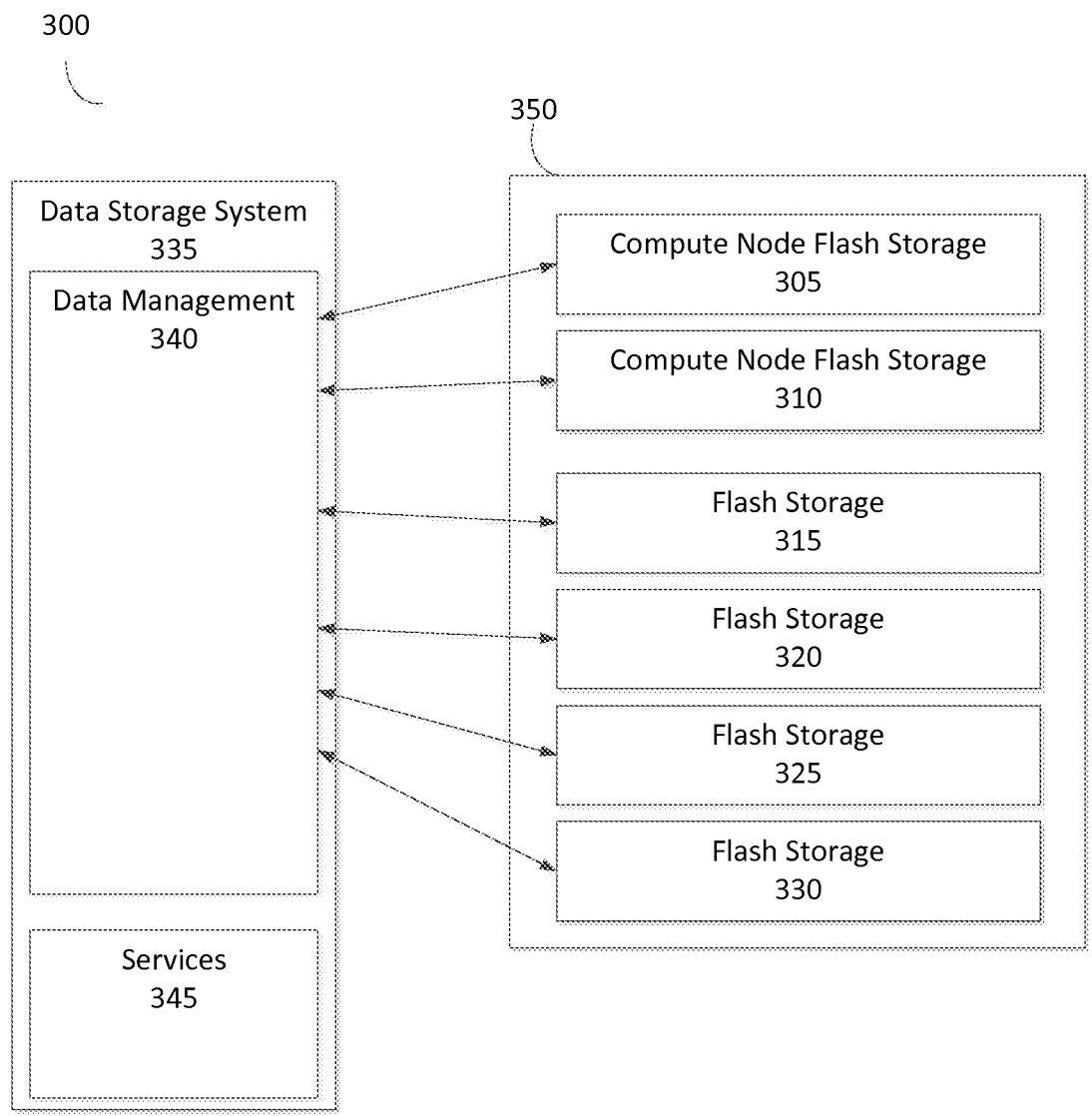
FIG. 3 is a simplified illustration of a data management module in a data storage system managing flash storage devices in a data storage environment, in accordance with an embodiment of the present disclosure.

Refer to the example embodiment of FIG. 3. FIG. 3 is a simplified illustration of a data management module in a data storage system managing flash storage devices in a data storage environment, in accordance with an embodiment of the present disclosure. Data storage environment 300 includes data storage system 335 and flash storage stack 350. Flash storage stack 350 includes compute node flash storage 305, 310 and flash storage 315, 320, 325, 330. In many embodiments, a flash storage stack may be an abstraction of flash data storage within a data storage environment. In various embodiments, flash storage within a flash storage stack may reside throughout a data storage environment. In certain embodiments, flash storage within a flash storage stack may reside in a single flash appliance.

In this embodiment, Data storage system 335 includes data management module 340 and services module 345. Data management module 340 is in communication with compute node flash storage 305, 310 and flash storage 315, 320, 325, 330. Data management module 340 utilizes services module 345 to provide one or more users of flash stack 350 with one or more QoS.

Figure 4:
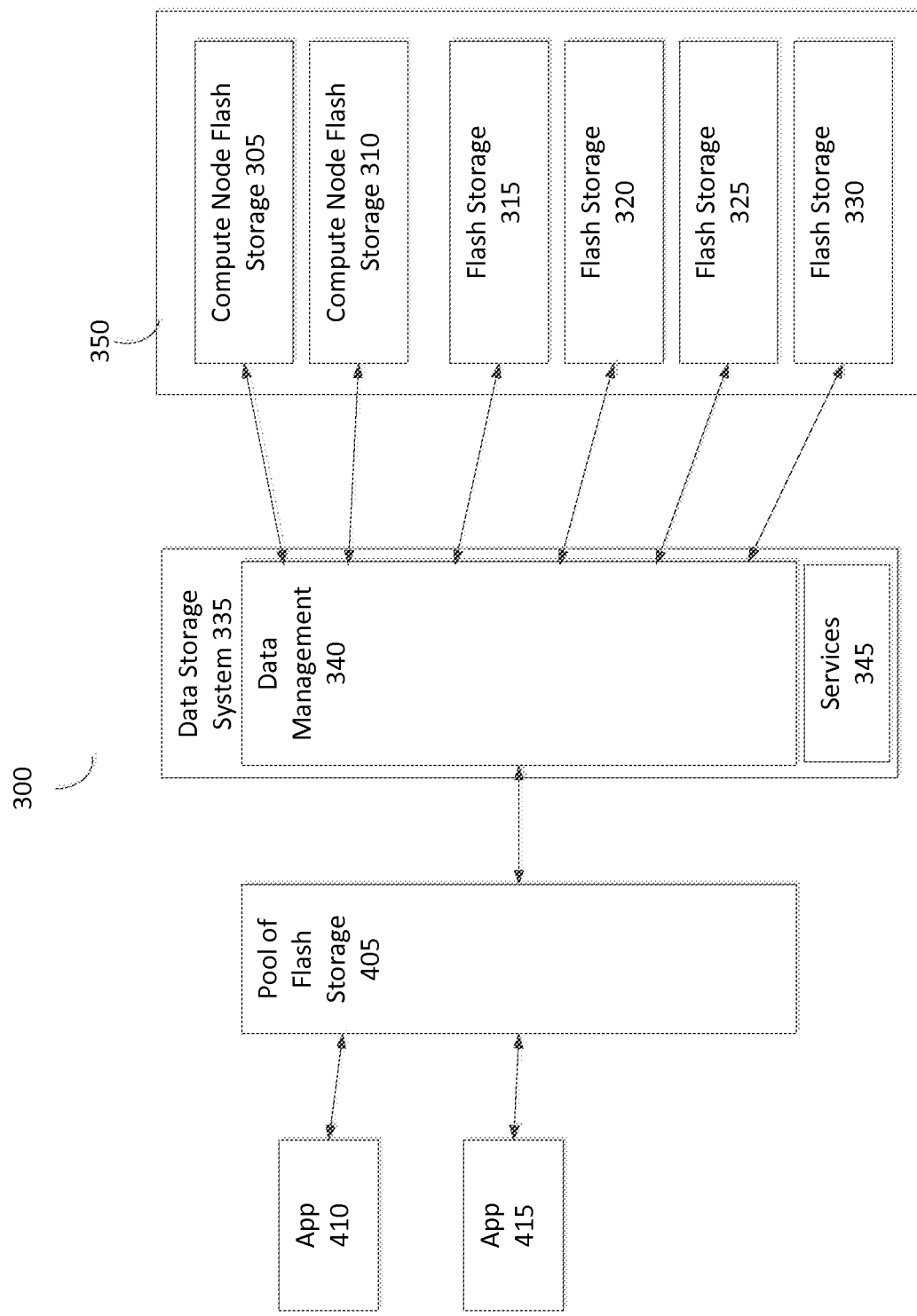
FIG. 4 is a simplified illustration of applications utilizing a pool of data storage in a data storage environment, in accordance with an embodiment of the present disclosure.

Refer to the example embodiment of FIG. 4. FIG. 4 is a simplified illustration of applications utilizing a pool of data storage in a data storage environment, in accordance with an embodiment of the present disclosure. Data storage environment 300 includes data storage system 335 and flash storage stack 350. Data storage system 335 includes data management module 340 and services module 345. In this embodiment, data management module 340 makes pool of flash storage 405 available in data storage environment 300. Pool of flash storage 405 is enabled to be utilized by application 410 and application 415. In many embodiments, a data storage system may have an interface layer which may expose one or more pools of flash storage for external use. In various embodiments, a data management module within a data storage system may include an interface layer which may be enabled to expose one or more pools of flash storage for external use. As shown, data management module 340 is in communication with flash storage within flash storage stack 350. Data management module 340 is enabled to provide pool of flash storage 405 from flash storage within flash storage stack 350.

Figure 5:
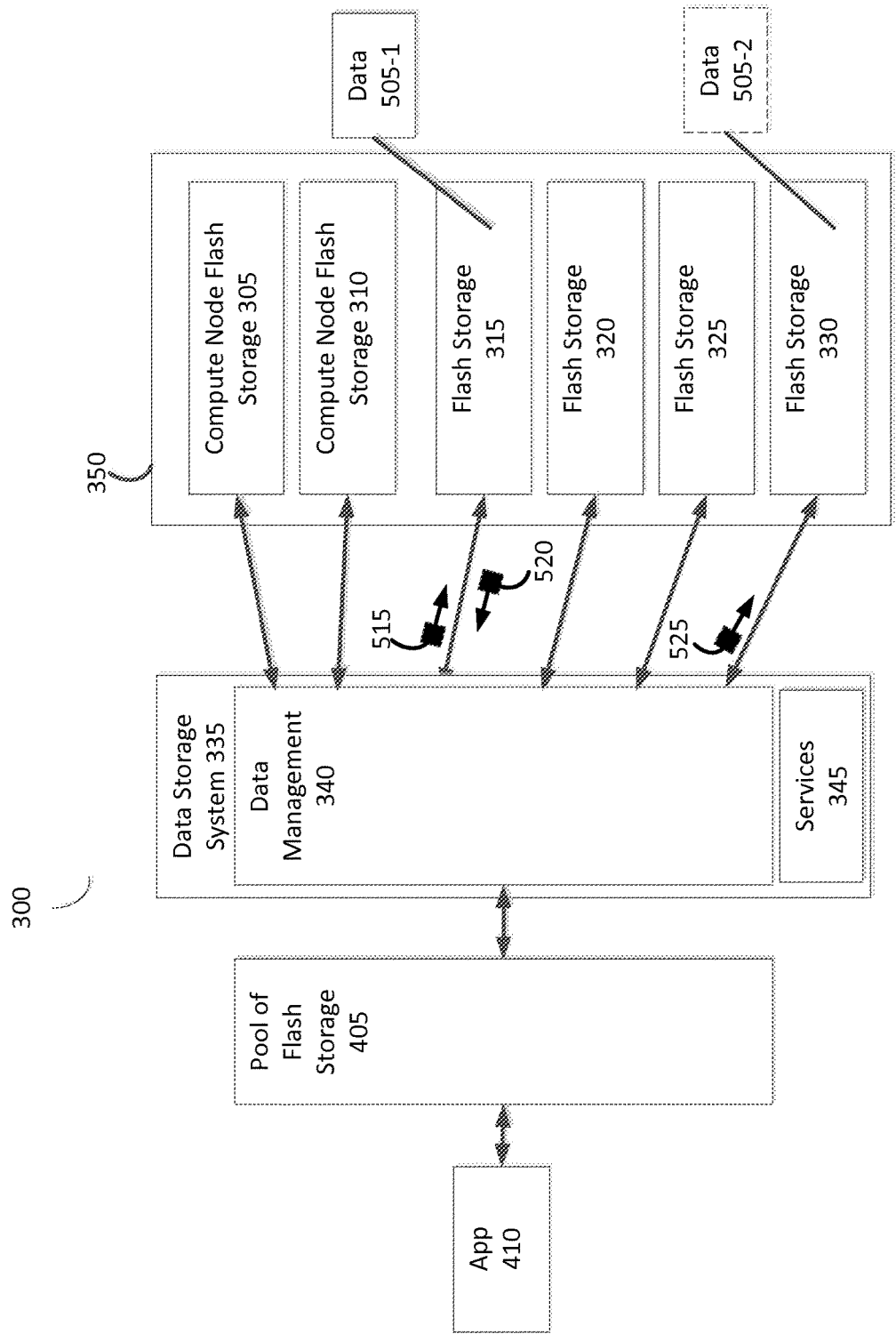
FIG. 5 is a simplified illustration of a data management module managing flash storage within a flash storage stack, in accordance with an embodiment of the present disclosure.

Refer to the example embodiment of FIG. 5. FIG. 5 is a simplified illustration of a data management module managing flash storage within a flash storage stack, in accordance with an embodiment of the present disclosure. As shown, data storage environment 300 includes data storage system 335 and flash storage stack 350. Data storage system 335 includes data management module 340 and services module 345. Data management module 340 provides pool of flash storage 405 using flash storage stack 350. Application 410 is enabled to utilize pool of flash storage 405. In this embodiment, data management module 340 is managing compute node flash storage 305, 310 and flash storage 315, 320, 325, 330 within flash storage stack 350. In many embodiments, portions of the flash storage stack may be included in the data storage system. In various embodiments, portions of the flash stack may be resident throughout a data storage environment and in communication with one or more data storage systems.

As shown, application 410 is using pool of flash storage 405 to store data 505-1. Application 410 is not aware where within flash storage stack 350 data 505-1 is stored. Data management module 340 is enabled to move data 505-1 throughout flash storage stack 350 to manage wear levels of compute node flash storage 305, 310, and flash storage 315, 320, 325, 330. In this embodiment, data management module 340 is managing wear within flash storage stack 350 by moving data 505-1 from flash storage 315 to flash storage 330. To increase longevity of flash storage 315, data management module 340 is enabled to send message 515 to flash storage 315 to request movement of data 505-1. Flash storage 315 is enabled to respond to message 515 with message 520, which contains data 505-1. Data management module 340 is enabled to use data within message 520 and send message 525 to flash storage 330 to place data 505-1 on flash storage 330 as data 505-2.

Figure 6:
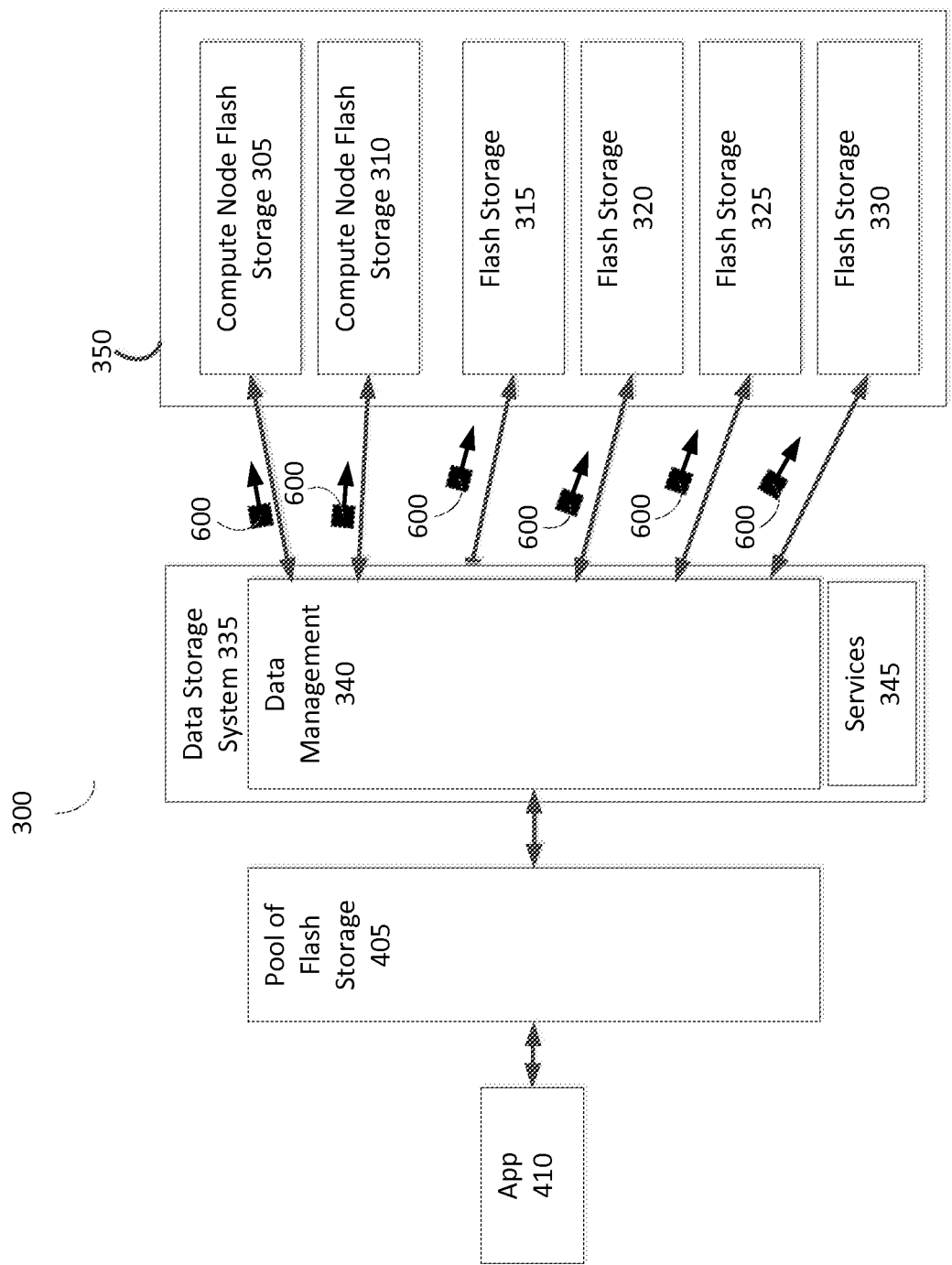
FIG. 6 is a simplified illustration of a data storage system configuring flash storage within a flash storage stack within a data storage environment, in accordance with an embodiment of the present disclosure.

Refer to the example embodiment of FIG. 6. FIG. 6 is a simplified illustration of a data storage system configuring flash storage within a flash storage stack within a data storage environment, in accordance with an embodiment of the present disclosure. As shown, data storage environment 300 includes data storage system 335 and flash storage stack 350. Data storage system 335 includes data management 340 and services module 345. Flash storage stack 350 includes compute node flash storage 305, 310 and flash storage 315, 320, 325, 330. In this embodiment, data management module 340 is enabled to use message 600 to configure compute node flash storage 305, 310 and flash storage 315, 320, 325, 330 within flash storage stack 350. In many embodiments, a data management module may be enabled to send configuration messages to flash storage which may relate to, but are not limited to, over provisioning, write management, I/O analysis, wear leveling, device configuration, garbage collection, data shaping, direct mapped buffers, as well as other services managed on flash devices.

Figure 7:
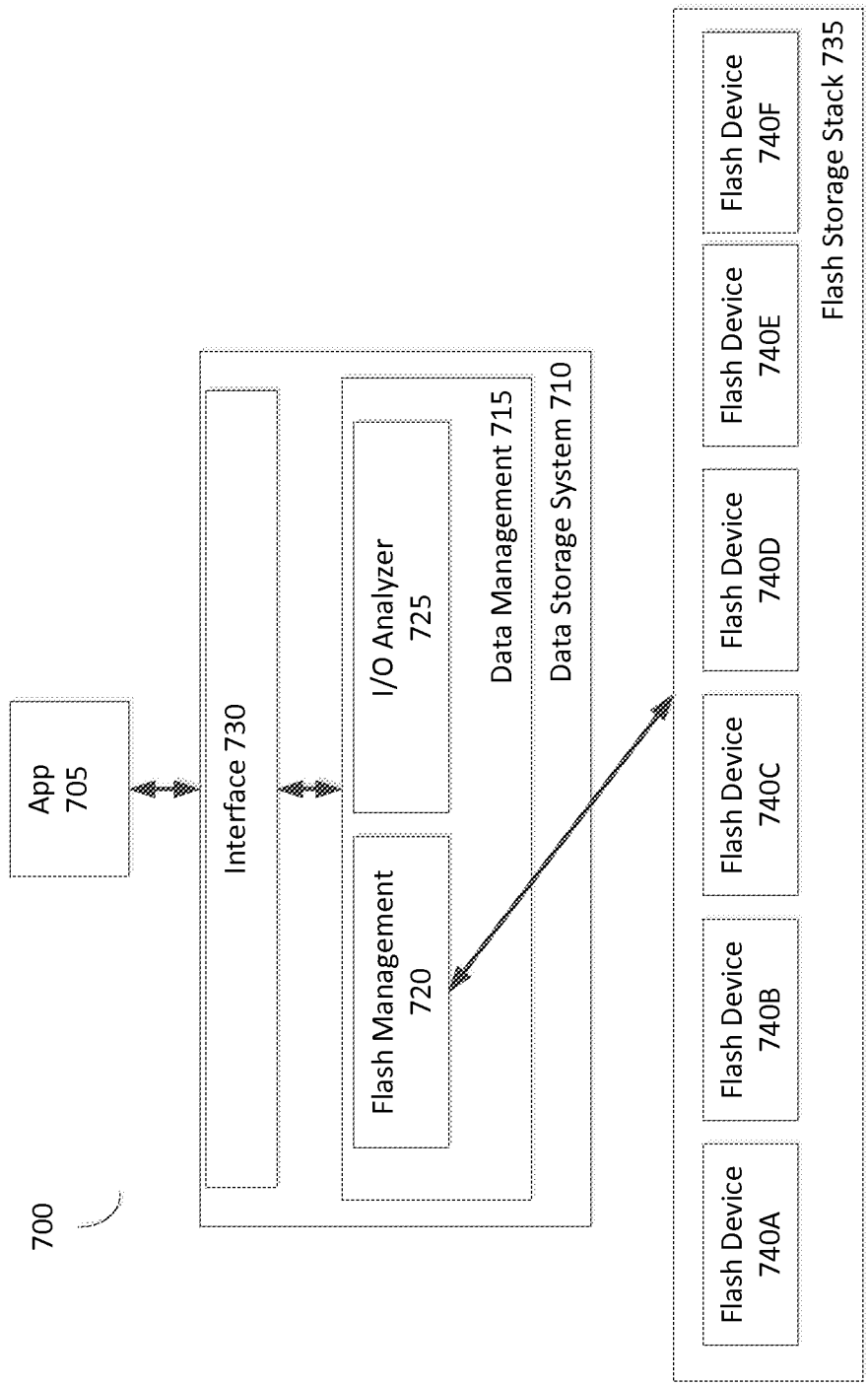
FIG. 7 is an alternative simplified illustration of a data storage system managing a flash storage stack in a data storage environment, in accordance with an embodiment of the present disclosure.

Refer to the example embodiment of FIG. 7. FIG. 7 is an alternative simplified illustration of a data storage system managing a flash storage stack in a data storage environment, in accordance with an embodiment of the present disclosure. Data storage environment 700 includes data storage system 710 and flash storage stack 735. Flash storage stack 735 is an abstraction of each of Flash devices (740A-F, 740 generally) within data storage environment 700. In many embodiments, a flash device may reside within a compute node, a data storage system, an appliance, and/or other device within a data storage environment.

In this embodiment, data storage system 710 includes interface module 730 and data management module 715. Interface module 730 directs read/write I/Os from application 705 to data management module 715. Data management module 715 includes flash management module 720 and I/O analyzer module 725. I/O analyzer module 725 is enabled to receive I/Os from interface module 730 and analyze I/Os for patterns. I/O analyzer 725 is enabled to use found patterns to determine one or more periods of high and/or low data storage usage which enables flash management module 720 to make I/O aware decisions as to how to manage flash storage stack 735. I/O analyzer 725 is enabled to sort received I/Os based on one or more parameters. In some embodiments, an I/O sorting parameter may include, but is not limited to, I/O size, to create IO Flows and/or stream like characteristics, and/or I/O update frequency. Based on a determination by I/O analyzer 725, flash management module 720 is enabled to manage flash devices 740 within flash storage stack 735.

Figure 8:
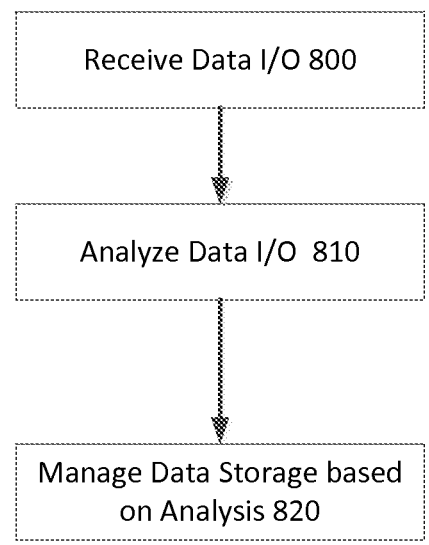
FIG. 8 is a simplified flowchart of a method of managing flash devices within a data storage environment as shown in FIG. 7, in accordance with an embodiment of the present disclosure.

Refer to the example embodiments of FIGS. 7 and 8. FIG. 8 is a simplified flowchart of a method of managing flash devices within a data storage environment as shown in FIG. 7, in accordance with an embodiment of the present disclosure. In FIG. 7, application 705 is utilizing flash storage stack 735 using data storage system 710. Data storage system 710 receives data I/Os (Step 800) from application 705 using interface module 730. Interface module 730 directs received data I/Os to I/O analyzer module 725 within data management module 715. I/O analyzer module 725 analyzes received data I/Os (Step 810) and makes a determination that the received I/Os will not be updated frequently. Flash management module 720 receives the determination from I/O analyzer module 725 and flash management module 720 manages flash storage stack 735 accordingly (Step 820). In most embodiments, managing a flash storage stack may include configuring one or more flash devices within a flash storage stack. In various embodiments, managing a flash storage stack may include directing a size, a location, and/or other attribute of a data I/O when sending the data I/O to the flash storage stack.

Figure 9:
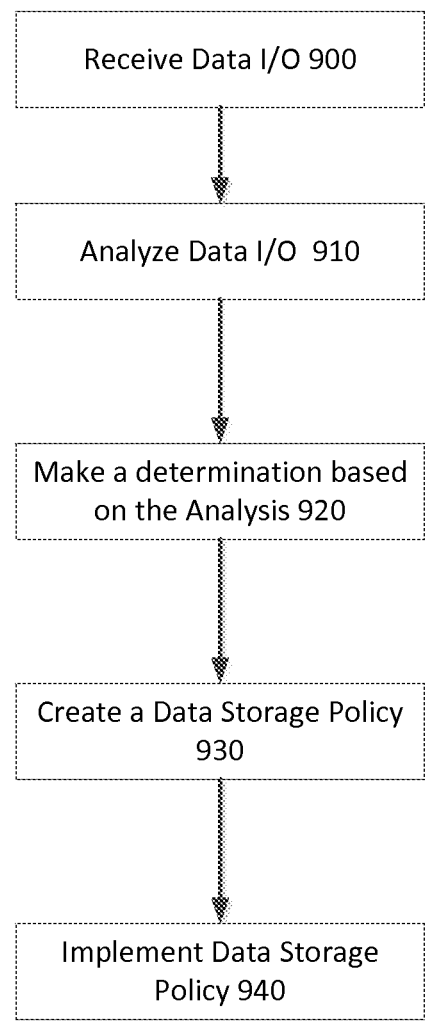
FIG. 9 is an alternative simplified flowchart of a method of managing flash devices within a data storage environment as shown in FIG. 7, in accordance with an embodiment of the present disclosure.

Refer to the example embodiments of FIGS. 7 and 9. FIG. 9 is an alternative simplified flowchart of a method of managing flash devices within a data storage environment as shown in FIG. 7, in accordance with an embodiment of the present disclosure. In FIG. 7, application 705 is utilizing flash storage stack 735 using data storage system 710. Data storage system 710 receives data I/Os (Step 900) from application 705 using interface module 730. Interface module 730 directs received data I/Os to I/O analyzer module 725 within data management module 715. I/O analyzer module 725 analyzes received data I/Os (Step 910) and makes a determination that the received I/Os will be heavily updated on the first and third day of each week (920). Flash management module 720 receives the determination from I/O analyzer module 725 and creates a data storage policy directing each flash device 740 associated with received I/Os to delay garbage collection during the first and third day of each week (Step 930). Data management module 715 implements the data storage policy by configuring each flash device 740 receiving I/Os from application 705 (Step 940).

Figure 10:
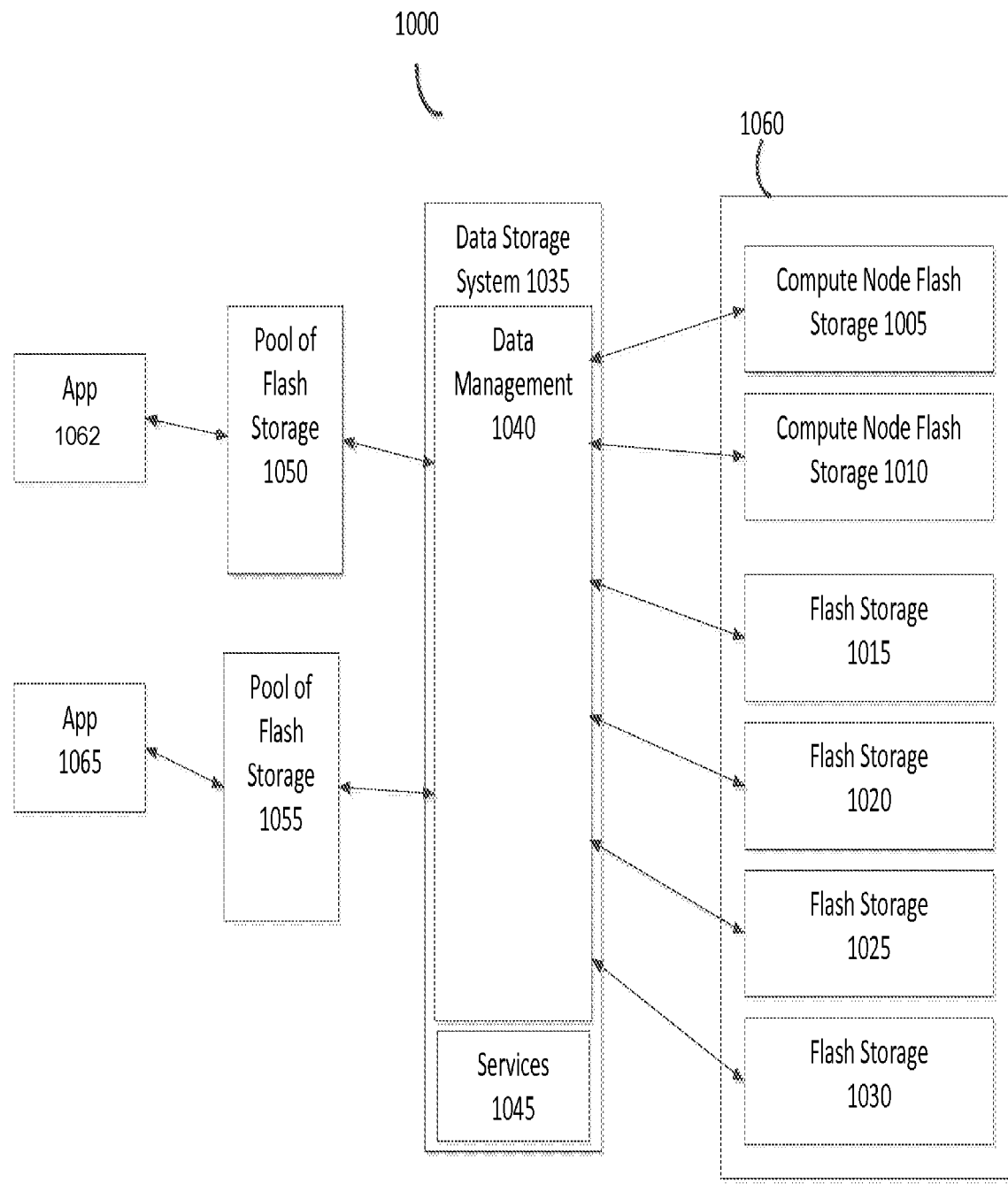
FIG. 10 is a simplified embodiment of a data storage environment, in accordance with an embodiment of the present disclosure.

Refer to the example embodiment of FIG. 10. FIG. 10 is a simplified embodiment of a data storage environment, in accordance with an embodiment of the present disclosure. As shown, data storage environment 1000 includes data storage system 1035 and flash storage stack 1060. Data storage system 1035 includes data management module 1040 and services module 1045. Flash storage stack 1060 is an abstraction of data storage environment 1000 which includes representations of compute node flash storage 1005, 1010 and flash storage 1015, 1020, 1025, 1030. In many embodiments, compute node flash storage and/or flash storage may be provided by one or more compute nodes, one or more data storage systems, and/or one or more data storage appliances resident within a data storage environment.

In this embodiment, data management module 1040 within data storage system 1035 provides pool of flash storage 1050 and pool of flash storage 1055. Data management module is enabled to provide pool of flash storage 1050 and pool of flash storage 1055 using data storage within flash stack storage 1060. In many embodiments, a data management module may be enabled to provide a plurality of pools of data storage using a flash storage stack. As shown, application 1062 is enabled to utilize pool of flash storage 1050 and application 1065 is enabled to utilize pool of flash storage 1055.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 11:
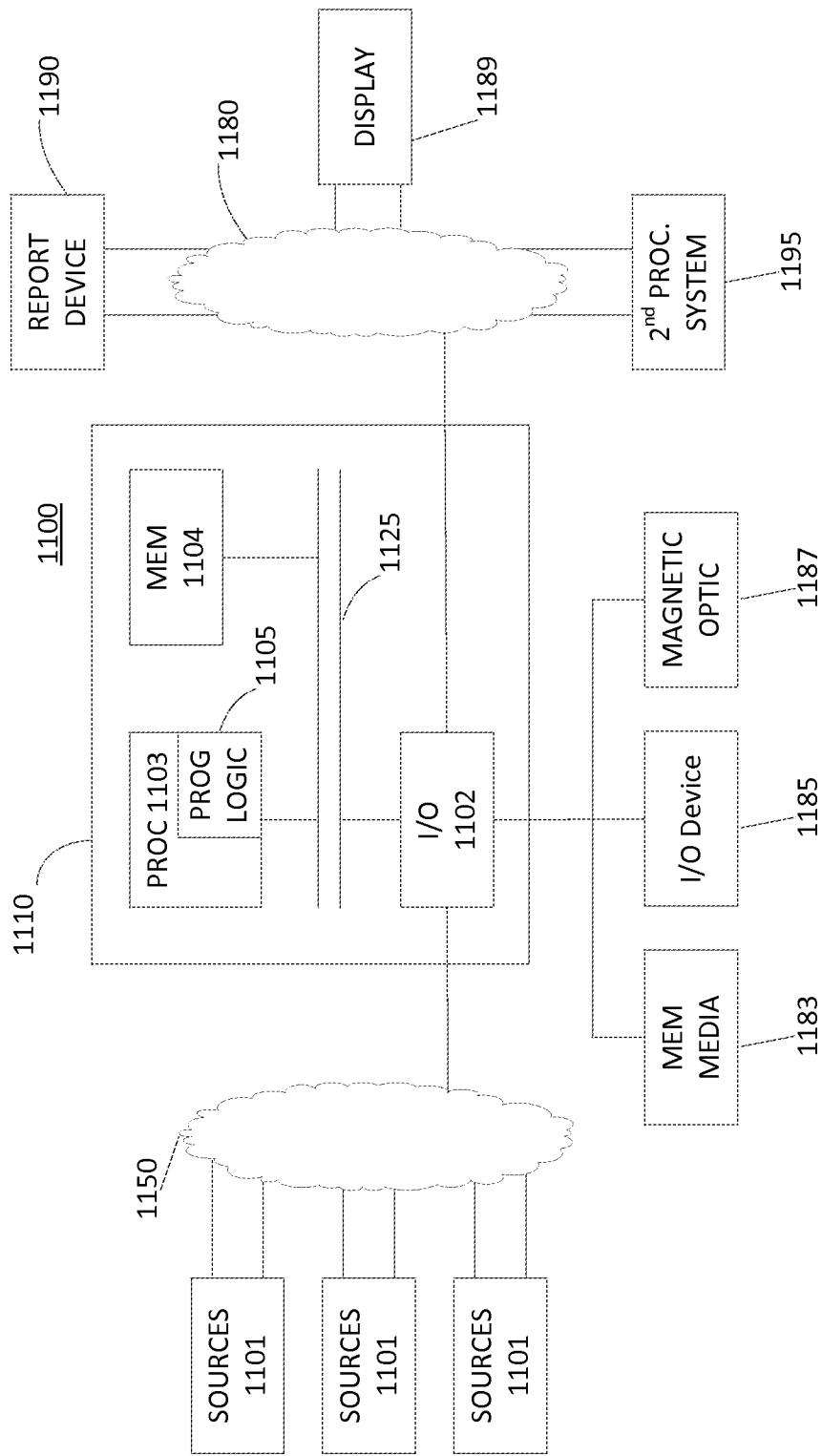
FIG. 11 is an example of an embodiment of an apparatus that may utilize the techniques described herein, in accordance with an embodiment of the present disclosure.

FIG. 11 is a block diagram illustrating an apparatus, such as a computer 1110 in a network 1100, which may utilize the techniques described herein according to an example embodiment of the present invention. The computer 1110 may include one or more I/O ports 1102, a processor 1103, and memory 1104, all of which may be connected by an interconnect 1125, such as a bus. Processor 1103 may include program logic 1105. The I/O port 1102 may provide connectivity to memory media 1183, I/O devices 1185, and drives 1187, such as magnetic or optical drives. The computer 1110 is configured to communicate with a plurality of sources 1101 via a network 1150 using the I/O port 1102. The computer 1110 is further configured to communicate with a display 1189, a report device 1190, and a second processing system 1195 via a network 1180 using the I/O port 1102. When the program code is loaded into memory 1104 and executed by the computer 1110, the machine becomes an apparatus for practicing the invention. When implemented on one or more general-purpose processors 1103, the program code combines with such a processor to provide a unique apparatus that operates analogously to specific logic circuits. As such, a general purpose digital machine can be transformed into a special purpose digital machine.

Figure 12:
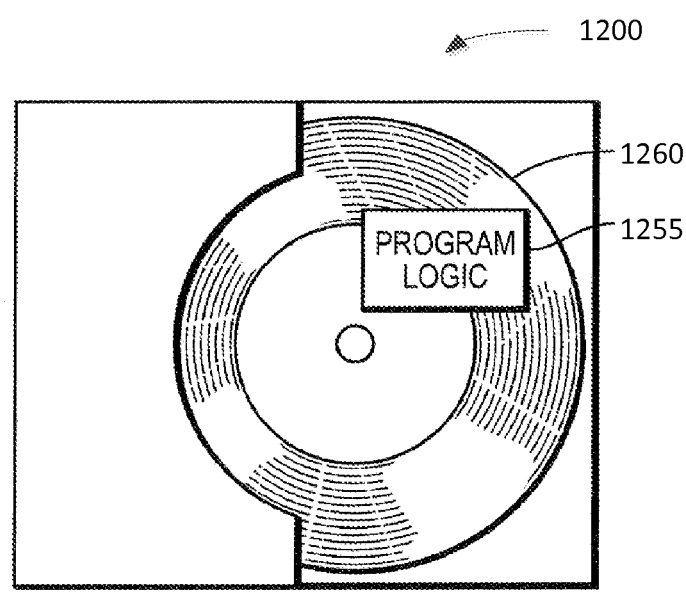
FIG. 12 is an example of a method embodied on a computer readable storage medium that may utilize the techniques described herein, in accordance with an embodiment of the present disclosure.

FIG. 12 is a block diagram illustrating a method embodied on a computer readable storage medium 1260 that may utilize the techniques described herein according to an example embodiment of the present invention. FIG. 12 shows Program Logic 1255 embodied on a computer-readable medium 1260 as shown, and wherein the Logic is encoded in computer-executable code configured for carrying out the methods of this invention and thereby forming a Computer Program Product 1200. Program Logic 1255 may be the same logic 1105 on memory 1104 loaded on processor 1103 in FIG. 11. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for managing flash devices within a data storage environment utilized by an application of one or more applications, wherein the application accesses the managed flash devices through a pool of flash storage provided by the data storage environment, the computer-executable method comprising:
   receiving a data I/O from the application, wherein the data I/O is directed toward the pool of flash storage;
   wherein the data storage environment provides the pool of flash storage from two or more data storage systems including sources of flash data storage within the data storage environment, wherein each of the two or more data storage systems is enabled to include one or more flash devices;
   the pool of flash storage comprising a flash stack including at least a first flash device implemented in a compute node of the data storage environment, a second flash device implemented in a given one of the data storage systems that is separate from the compute node in which the first flash device is implemented, and a third flash device implemented in a flash appliance that is separate from the compute node in which the first flash device is implemented and the given data storage system in which the second flash device is implemented;
   the pool of flash storage thereby comprising multiple distinct flash devices from respective ones of the compute node, the given data storage system and the flash appliance, the multiple distinct flash devices corresponding to respective different layers of the flash stack;
   analyzing the data I/O in relation to the flash devices;
   grouping the data I/O with one or more data streams based on a type of workload associated with the data I/O; and
   managing the flash devices in the flash stack of the pool of flash storage based on the analysis of the data I/O, each of the one or more applications using the pool of flash storage being unaware of the management of the flash devices;
   wherein managing the flash devices in the flash stack of the pool of flash storage is performed in a data management module comprising a processor coupled to a memory;
   wherein managing the flash devices in the flash stack of the pool of flash storage comprises:
      monitoring wear of the flash devices; and
      reducing wear of the flash devices by selecting at least one of recoding data such that an increased number of bits are in the erased state and compressing data; and
   wherein the data storage environment is enabled to manage low level functions of each of the flash devices within the data storage environment.

2. The computer-executable method of claim 1, wherein the analyzing comprises:
   determining a pattern from the data I/O; and
   creating a data management policy based on the determination, wherein the data management policy indicates how each of the managed flash devices are to be allocated to the pool of flash storage.

3. The computer-executable method of claim 2, wherein managing the flash devices based on the data I/O comprises:
   modifying an allocation of the managed flash devices to the pool of flash storage based on the data management policy.

4. The computer-executable method of claim 2, wherein managing the flash devices based on the data I/O comprises:
   overprovisioning a first flash device of the managed flash devices based on the data management policy.

5. The computer-executable method of claim 1, further comprising:
   managing writes to the pool of flash storage based on the analysis of the data I/O.

6. The computer-executable method of claim 1, wherein managing the flash devices based on the data I/O further comprises:
   moving data from a first flash device of the flash devices to a second flash device of the flash devices, wherein the application is unaware that the data moved from the first flash device to the second flash device.

7. A system, comprising:
   a data storage environment including flash devices, wherein one or more applications utilize the data storage environment, wherein the one or more applications access the flash devices through a pool of flash storage provided by the data storage environment; and
   computer-executable program logic encoded in memory of one or more computers enabled to manage the flash devices within the data storage environment, wherein the computer-executable program logic is configured for the execution of:
      receiving a data I/O from an application of the one or more applications, wherein the data I/O is directed toward the pool of flash storage;
      wherein the data storage environment provides the pool of flash storage from two or more data storage systems including sources of flash data storage within the data storage environment, wherein each of the two or more data storage systems is enabled to include one or more flash devices;
      the pool of flash storage comprising a flash stack including at least a first flash device implemented in a compute node of the data storage environment, a second flash device implemented in a given one of the data storage systems that is separate from the compute node in which the first flash device is implemented, and a third flash device implemented in a flash appliance that is separate from the compute node in which the first flash device is implemented and the given data storage system in which the second flash device is implemented;

the pool of flash storage thereby comprising multiple distinct flash devices from respective ones of the compute node, the given data storage system and the flash appliance, the multiple distinct flash devices corresponding to respective different layers of the flash stack;

analyzing the data I/O in relation to the flash devices;

grouping the data I/O with one or more data streams based on a type of workload associated with the data I/O; and managing the flash devices in the flash stack of the pool of flash storage based on the analysis of the data I/O, each of the one or more applications using the pool of flash storage being unaware of the management of the flash devices;

wherein managing the flash devices in the flash stack of the pool of flash storage is performed in a data management module comprising a processor coupled to a memory;

wherein managing the flash devices in the flash stack of the pool of flash storage comprises:
monitoring wear of the flash devices; and
reducing wear of the flash devices by selecting at least one of recoding data such that an increased number of bits are in the erased state and compressing data; and wherein the data storage environment is enabled to manage low level functions of each of the flash devices within the data storage environment.

8. The system method of claim 7, wherein the analyzing comprises:
determining a pattern from the data I/O; and
creating a data management policy based on the determination, wherein the data management policy indicates how each of the managed flash devices are to be allocated to the pool of flash storage.

9. The system of claim 8, wherein managing the flash devices based on the data I/O comprises:
modifying an allocation of the managed flash devices to the pool of flash storage based on the data management policy.

10. The system of claim 8, wherein managing the flash devices based on the data I/O comprises:
overprovisioning a first flash device of the managed flash devices based on the data management policy.

11. The system of claim 7, wherein the computer-executable program logic is further configured for the execution of:
managing writes to the pool of flash storage based on the analysis of the data I/O.

12. The system of claim 7, wherein managing the flash devices based on the data I/O further comprises:
moving data from a first flash device of the flash devices to a second flash device of the flash devices, wherein the application is unaware that the data moved from the first flash device to the second flash device.

13. A computer program product for managing flash devices within a data storage environment utilized by an application of one or more applications, wherein the application accesses the managed flash devices through a pool of flash storage provided by the data storage environment, the computer program product comprising:
a non-transitory computer readable medium encoded with computer-executable code, the code configured to enable the execution of:
receiving a data I/O from the application, wherein the data I/O is directed toward the pool of flash storage;
wherein the data storage environment provides the pool of flash storage from two or more data storage systems including sources of flash data storage within the data storage environment, wherein each of the two or more data storage systems is enabled to include one or more flash devices;
the pool of flash storage comprising a flash stack including at least a first flash device implemented in a compute node of the data storage environment, a second flash device implemented in a given one of the data storage systems that is separate from the compute node in which the first flash device is implemented, and a third flash device implemented in a flash appliance that is separate from the compute node in which the first flash device is implemented and the given data storage system in which the second flash device is implemented;
the pool of flash storage thereby comprising multiple distinct flash devices from respective ones of the compute node, the given data storage system and the flash appliance, the multiple distinct flash devices corresponding to respective different layers of the flash stack;
analyzing the data I/O in relation to the flash devices;
grouping the data I/O with one or more data streams based on a type of workload associated with the data I/O; and
managing the flash devices in the flash stack of the pool of flash storage based on the analysis of the data I/O, each of the one or more applications using the pool of flash storage being unaware of the management of the flash devices;
wherein managing the flash devices in the flash stack of the pool of flash storage is performed in a data management module comprising a processor coupled to a memory;
wherein managing the flash devices in the flash stack of the pool of flash storage comprises:
monitoring wear of the flash devices; and
reducing wear of the flash devices by selecting at least one of recoding data such that an increased number of bits are in the erased state and compressing data; and
wherein the data storage environment is enabled to manage low level functions of each of the flash devices within the data storage environment.

14. The computer program product of claim 13, wherein the analyzing comprises:
determining a pattern from the data I/O; and
creating a data management policy based on the determination, wherein the data management policy indicates how each of the managed flash devices are to be allocated to the pool of flash storage.

15. The computer program product of claim 14, wherein managing the flash devices based on the data I/O comprises:
modifying an allocation of the managed flash devices to the pool of flash storage based on the data management policy.

16. The computer program product of claim 14, wherein managing the flash devices based on the data I/O comprises:
overprovisioning a first flash device of the managed flash devices based on the data management policy.

17. The computer program product of claim 13, the code further configured to enable the execution of:
managing writes to the pool of flash storage based on the analysis of the data I/O.

18. The computer program product of claim 13, wherein managing the flash devices based on the data I/O further comprises:

moving data from a first flash device of the flash devices to a second flash device of the flash devices, wherein the application is unaware that the data moved from the first flash device to the second flash device.

19. The computer program product of claim 13, wherein the flash stack further comprises a fourth flash device implemented in another flash appliance that is separate from the compute node in which the first flash device is implemented and the given data storage system in which the second flash device is implemented.

20. The computer program product of claim 19, wherein the flash stack further comprises a fifth flash device implemented in another compute node of the data storage environment that is separate from the compute node in which the first flash device is implemented.

\* \* \* \* \*